United States Patent
Czainski et al.

(10) Patent No.: US 9,935,497 B2
(45) Date of Patent: Apr. 3, 2018

(54) ARRANGEMENT AND METHOD FOR PROVIDING A VEHICLE WITH ELECTRIC ENERGY BY MAGNETIC INDUCTION

(71) Applicant: Bombardier Transportation GmbH, Berlin (DE)

(72) Inventors: Robert Czainski, Szczecin (PL); Konrad Woronowicz, Kingston (CA)

(73) Assignee: Bombardier Transportation GmbH, Berlin (DE)

( * ) Notice: Subject to any disclaimer, the term of this patent is extended or adjusted under 35 U.S.C. 154(b) by 491 days.

(21) Appl. No.: 14/396,200

(22) PCT Filed: Apr. 23, 2013

(86) PCT No.: PCT/EP2013/058387
§ 371 (c)(1),
(2) Date: Oct. 22, 2014

(87) PCT Pub. No.: WO2013/160299
PCT Pub. Date: Oct. 31, 2013

(65) Prior Publication Data
US 2015/0084406 A1    Mar. 26, 2015

(30) Foreign Application Priority Data

Apr. 23, 2012 (GB) ................... 1207144.5

(51) Int. Cl.
| | |
|---|---|
| *H02J 50/10* | (2016.01) |
| *H02J 7/02* | (2016.01) |
| *H02J 50/20* | (2016.01) |
| *B60L 11/18* | (2006.01) |
| *B60M 7/00* | (2006.01) |
| *H01F 38/14* | (2006.01) |
| *H01F 41/06* | (2016.01) |
| *H02J 5/00* | (2016.01) |

(52) U.S. Cl.
CPC ............. *H02J 50/10* (2016.02); *B60L 11/182* (2013.01); *B60M 7/003* (2013.01); *H01F 38/14* (2013.01);
(Continued)

(58) Field of Classification Search
CPC ... B60L 11/182; B60L 2200/26; B60M 7/003; H01F 38/14; H01F 41/06; H02J 5/005;
(Continued)

(56) References Cited

U.S. PATENT DOCUMENTS 3,971,126 A * 7/1976 Buhrer ................. G11C 19/085
29/604
5,034,717 A * 7/1991 Shinkai ............... H01F 27/2847
336/183
(Continued)

FOREIGN PATENT DOCUMENTS

| | | |
|---|---|---|
| CN | 102083652 A | 6/2011 |
| CN | 102159422 A | 8/2011 |

(Continued)

*Primary Examiner* — Rexford Barnie
*Assistant Examiner* — Elim Ortiz
(74) *Attorney, Agent, or Firm* — The Webb Law Firm (57) ABSTRACT

An arrangement for providing a vehicle with electric energy includes a receiving device adapted to receive the magnetic component of an alternating electromagnetic field and to produce an alternating electric current by magnetic induction. The receiving device includes at least one phase line, each phase line being adapted to carry a phase of the alternating electric current. The at least one phase line forms a line arrangement which extends in a longitudinal direction transversely to a flux line direction, in which magnetic flux lines of the electromagnetic field penetrate the line arrangement, so that the line arrangement has a first end and a second end, the ends being located at opposite ends of the line arrangement in the longitudinal direction. The width of the line arrangement, gradually decreases along the extension of the line arrangement towards the first end and/or towards the second end.

13 Claims, 6 Drawing Sheets

(52) U.S. Cl.
CPC .............. *H01F 41/06* (2013.01); *H02J 5/005* (2013.01); *H02J 7/025* (2013.01); *H02J 50/20* (2016.02); *B60L 2200/26* (2013.01); *Y02T 10/7005* (2013.01); *Y02T 10/7072* (2013.01); *Y02T 90/122* (2013.01); *Y02T 90/14* (2013.01); *Y10T 29/4902* (2015.01); *Y10T 29/49071* (2015.01)

(58) Field of Classification Search
CPC ............. Y02T 10/7005; Y02T 10/7072; Y02T 90/122; Y02T 90/14; Y10T 29/4902; Y10T 29/49071
See application file for complete search history.

(56) References Cited

U.S. PATENT DOCUMENTS

| | | | | |
|---|---|---|---|---|
| 5,130,583 | A * | 7/1992 | Andoh | .................. B60L 15/005 310/12.01 |
| 7,950,333 | B2 * | 5/2011 | Crawford | ................ B60L 13/04 104/283 |
| 2005/0178632 | A1 | 8/2005 | Ross | |
| 2008/0129246 | A1 * | 6/2008 | Morita | .................... B60L 5/005 320/108 |
| 2009/0160262 | A1 | 6/2009 | Schmidt et al. | |
| 2011/0266109 | A1 | 11/2011 | Meins et al. | |
| 2011/0315496 | A1 * | 12/2011 | Bohori | .................... B60L 5/005 191/10 |
| 2012/0055751 | A1 | 3/2012 | Vollenwyder et al. | |

FOREIGN PATENT DOCUMENTS

| | | |
|---|---|---|
| DE | 102007014712 A1 | 12/2007 |
| EP | 0289868 A2 | 11/1988 |
| GB | 2476318 A | 6/2011 |
| JP | 2008120357 A | 5/2008 |
| RU | 2009101410 A | 7/2010 |
| RU | 2428329 C1 | 9/2011 |
| WO | 0102211 A1 | 1/2001 |
| WO | 2008051611 A2 | 5/2008 |
| WO | 2010031595 A2 | 3/2010 |

* cited by examiner

Fig. 7 under international Application No. PCT/EP2013/058387 filed
ARRANGEMENT AND METHOD FOR PROVIDING A VEHICLE WITH ELECTRIC ENERGY BY MAGNETIC INDUCTION

CROSS-REFERENCE TO RELATED APPLICATIONS

This application is the United States national phase of International Application No. PCT/EP2013/058387 filed Apr. 23, 2013, and claims priority to United Kingdom Patent Application No. 1207144.5 filed Apr. 23, 2012, the disclosures of which are hereby incorporated in their entirety by reference.

BACKGROUND OF THE INVENTION

Field of the Invention

The invention relates to an arrangement for providing a vehicle with electric energy, wherein the arrangement comprises a generating device adapted to generate an alternating electromagnetic field and relates to an arrangement for providing a vehicle with electric energy, wherein the arrangement comprises a receiving device adapted to receive the magnetic component of the alternating electromagnetic field in order to produce an alternating electric current by magnetic induction. In particular, the electric current flows to an electric load while the magnetic induction causes an alternating electric voltage in the receiving device.

In addition, the invention relates to a vehicle comprising the arrangement. Furthermore, the invention relates to a system for transferring energy to a vehicle, wherein the system comprises the receiving device and the generating device. The invention also relates to a method of manufacturing the arrangement and to a method of operating a vehicle by means of the receiving device which receives the magnetic component of an alternating electromagnetic field and produces an alternating electric current by magnetic induction.

Description of Related Art

WO 2010/031595 A2 discloses an arrangement for providing a vehicle, in particular a track bound vehicle, with electric energy, wherein the arrangement comprises a receiving device adapted to receive the magnetic component of an alternating electromagnetic field and to produce an alternating electric current by electromagnetic induction. The receiving device comprises a plurality of windings and/or coils of electrically conducting material, wherein each winding or coil is adapted to produce a separate phase of the alternating electric current.

The present invention can be applied to any land vehicle, in particular track bound vehicles, such as rail vehicles (e.g. trams), but also to road automobiles, such as individual (private) passenger cars or public transport vehicles (e.g. busses). Preferably, the primary side conductor arrangement of the generating device which produces the alternating electromagnetic field is integrated in the track, road or parking area of the vehicle so that the electric lines of the primary side conductor arrangement extend in a plane which is nearly parallel to the surface of the road, track or parking area on which the vehicle may travel or may be parked.

Details of a preferred embodiment of the primary side conductor arrangement are described in WO 2010/031595 A2. For example, the current lines of the primary side conductor arrangement may extend along the track or road in a serpentine manner, i.e. some sections of the lines extend transversely to the travel direction and some sections of the lines extend in the direction of travel, thereby connecting the transversely extending sections. In particular, as illustrated in FIG. 5 and FIG. 12 of WO 2010/031595 A2, the primary side conductor arrangement preferably produces a magnetic wave which propagates in the direction of travel or opposite to the direction of travel. The speed of the wave is determined by the distance of the transversely extending sections and by the frequency of the alternating current which is carried by the different phases of the primary side electric conductor arrangement.

As also described by WO 2010/031595 A2, the receiving device can be located at the underside of a vehicle and may be covered by a ferromagnetic body, such as a body in the shape of a slab or plate. A suitable material is ferrite. The body bundles and redirects the field lines of the magnetic field and therefore reduces the field intensity above the body to nearly zero.

However, such a body of ferromagnetic material or, alternatively, a shield of electrically conducting material, cannot reduce the field intensity of the magnetic field to zero at locations sideways of the body or shield. In particular, while persons are entering or leaving the vehicle, they might pass the area sideways of the receiving device. Therefore, corresponding limits of the field intensity apply and must not be exceeded.

SUMMARY OF THE INVENTION

It is an object of the present invention to provide an arrangement for providing a vehicle with electric energy, a vehicle comprising the arrangement, a system comprising the arrangement, a method of manufacturing the arrangement and a method of operating a vehicle by means of a receiving device which reduce the field intensity sideways of the generating device and/or sideways of the receiving device.

In particular, the generating device may have the serpentine (alternatively called: meandering) configuration described in WO 2010/031595 A2. A preferred modification of the serpentine configuration will be described later.

Alternatively or in addition, the receiving device may have a "flat" configuration. An example of such a "flat" configuration is described by WO 2010/031595 A2, in particular in connection with FIGS. 13 to 17 of the document. "Flat" in this context means that the phase lines (i.e. the electric lines of the different phases) of the receiving device extend or approximately extend in a horizontal direction, if the primary side conductor arrangement and the track or road of the vehicle also extend in the horizontal direction. However, since such a receiving device typically comprises more than one turn or winding and furthermore comprises more than one phase line, there are crossings of electric lines, if viewed from above. Consequently, despite the flat configuration it is impossible that all sections of the electric lines are located within a flat area having the thickness of a single electric line.

Furthermore, at least one of the phase lines may comprise a coil having more than one turn. A turn is understood to be a section of the phase line which extends around a central axis of the coil. In other words: the section is turning around the central axis. Not in every case all turns perform a complete circulation around the central axis. Rather, in particular the last and first turn of a coil may not perform a complete circulation around the central axis so that electric connections to and from the coil can be made at appropriate locations and in an appropriate manner. On the other hand, if the coil has at least three turns, at least one of the turns is not the first and not the last turn and typically performs a complete circulation around the central axis.

In case of such a coil, the thickness of the coil measured in the direction of the central axis may be equal to the number of turns multiplied by the thickness of the electric line which performs the turns, for example. However, depending on the specific configuration of the coil, the thickness may be, alternatively, greater or smaller than the thickness mentioned before. For example, the consecutive turns may be wound around the central axis of the coil to form a spiral. This reduces the thickness of the coil, but also reduces the effective area of the coil compared to a coil having the same number of turns which all have the size of the outer turn of the spiral. In any case, it is preferred that all coils of the same phase line are formed in the same manner, e.g. all coils are spirals or all coils comprise turns which are stacked upon each other. However, the outlines of at least one end coil preferably enclose a smaller area than another coil or other coils. In case of a spiral end coil, the outer turn of the spiral would therefore be wound at a smaller winding radius or would enclose a smaller area than the outlines of another coil or of the other coils.

An embodiment of the present invention may comprise a plurality of coils, e.g. at least three coils, which are coils of the same phase line. This means that the electric line of at least one of the phase lines forms the at least three coils. A coil is understood to comprise at least one turn and, in case of more than one turn, a plurality of turns is arranged in such a manner, that sections of the different turns extend in parallel to each other, or extend approximately parallel to each other, and, optionally, have the same shape (such as rectangular, circular, etc.). A possible shape of the outline of the turns is rectangular, since a sequence of consecutive coils, each coil having rectangular turns, can be arranged to cover a rectangular effective area, which is the sum of the areas which are covered by the individual coils. However, it is preferred that coils forming the end of the coil arrangement are tapered, e.g. have a conical outline or the outline of a frustum of a cone. The area which is "covered" by an individual coil is the area across which magnetic flux lines of a magnetic field may extend, wherein the magnetic flux which corresponds to these flux lines causes magnetic induction by inducing a corresponding electric voltage in the coil.

Preferably, the central axes of a plurality of coils extend in parallel to each other. This applies to coils of different phase lines for carrying different phases of an alternating current and/or applies to coils of the same phase line.

Plural coils of at least one of the phase lines (and preferably of all phase lines) may be located next to each other so as to perform a sequence of consecutive coils which covers an effective area in a plane that extends perpendicularly to the central axes of the coils. In case of at least three coils, there is a first end coil and a second end coil at the opposite ends of the sequence and there is at least one middle coil in between the end coils of the sequence. Preferably, the first end coil and the second end coil are tapered towards their end.

Preferably, the effective area of the coils is the sum of the areas which are covered by the individual coils of the sequence, i.e. the coils do not overlap. However, a small overlapping area does not significantly reduce the effective area. Furthermore, there may be a small distance between the areas of neighboring coils in the sequence of coils, so that the effective area is not a continuous area. However, it is preferred that the distance is small (e.g. smaller than 2% of the longitudinal direction of the sequence of coils, which is the direction extending from the first end coil to the second end coil).

In particular, at least two of the coils of the coil arrangement are coils of the same phase line which are consecutively arranged in the longitudinal direction thereby defining at least one border zone so that a first and a second of the at least two coils of the same phase line border on each other, optionally with a gap or overlapping each other, wherein the first coil is an end coil located at the first end or at the second end of the coil arrangement. The first coil (and optionally as well the second coil, if there are only two consecutive coils) is a coil which is tapered towards the respective end of the coil arrangement in the longitudinal direction. Due to its tapered configuration along its extension towards the first end or towards the second end of the coil arrangement—the tapered coil covers a smaller area per unit length in the longitudinal direction in an end region at the first end or second end compared to a border region at the border zone. Generally speaking, the tapered region covers a smaller area per unit length, because it is narrower.

This is, for example, in contrast to standard coils, the turns of which follow a curved path in the end region and in the same manner in the border region. These standard coils are typically symmetric with respect to a straight line which extends transversely to the longitudinal direction in the middle of the longitudinal extension of the coil. Some curvature of the turns in the end region and in the border region of the coil is necessary, since electric lines cannot be bent so as to form a rectangle. Therefore, the curved path of the turns in the end region and in the border region is not considered as tapering in the sense of the present application. Rather, tapering of a coil having turns means that there is a continuously decreasing width in the longitudinal direction towards the end of the coil in addition to any curvature of the turns.

For example, at least one third of the extension of the end coil in the longitudinal direction, or at least one half of the extension and in particular cases more than half of the extension up to the whole extension of the coil in the longitudinal direction may have a tapered configuration, according to the present invention.

The invention is based on the following findings: The electric current, which flows through the phase line or phase lines during operation of the generating device, produces the electromagnetic field the magnetic component of which is to be received by the receiving device. In addition, the electric current, which flows through the phase line or phase lines during operation of the receiving device while the receiving device receives the magnetic component of the electromagnetic field and delivers electric power to any load in the vehicle, also produces an electromagnetic field, which may be called parasitic field. The electromagnetic fields which are produced by some of the different sections of the phase line(s) of the receiving device compensate each other by interference. The same applies to the electromagnetic fields which are produced by some of the different sections of the phase line(s) of the generating device.

With respect to the receiving device, this means for example that there are regions sideways of the middle section of a sequence of coils in which the field intensity is small or even close to zero. With respect to the generating device, this means for example that the field produced by meandering sections of the phase line or phase lines compensate each other and produce small or zero field intensity. "Field intensity" in this context means the amplitude of the flux density of the fluctuating electromagnetic field, in particular of the magnetic field. However, there are also regions sideways of the end regions of the generating device and of the receiving device having higher field intensities. The reason is that there is not a compensating section for each section. In addition, the fields produced by phase line sections at the ends may superpose each other, so that increased field amplitudes result.

In order to reduce the field intensities near the end or ends of the generating device or receiving device, in particular at defined locations, at least one end of the device is tapered. The expression "tapered" means that the width of the phase line arrangement decreases towards the end of the line arrangement. This does not necessarily mean that there are line sections of the phase line or phase lines which delimit the area which is covered by the line arrangement and extend towards the end of the line arrangement in a tapered fashion. This may be the case if the line arrangement comprises a coil of a phase line in the end region of the line arrangement. In the following, a line arrangement which comprises at least one coil of a phase line is also named coil arrangement. However, there are other possible line arrangements, for example the line arrangement similar to the arrangement described in WO 2010/031595 A2, in which at least one phase line meanders, i.e. comprises first line sections which extend transversely to the longitudinal direction of the line arrangement and further comprises second line sections which connect in each case two first line sections. If the end section of a line arrangement comprises a meandering phase line, the lengths of consecutive first line sections of the phase line decrease towards the end of the line arrangement. These lengths of the first line sections that extend transversely to the longitudinal direction can be measured in the width direction and are therefore not necessarily equal to the length of a corresponding cable section, e.g. if the cable forms some ripples or corrugations in the first line section. However, an outline of the line arrangement can be defined even for a meandering phase line or for meandering phase lines, so that the outline includes the whole area of the line arrangement, but does not follow line sections of the line arrangement towards the interior of the line arrangement. For example, line sections or line locations at the outer periphery of the line arrangement can be connected by straight sections of the outline or by sections of the outline which are curved continuously. As mentioned above, in case of a coil arrangement which comprises a coil of a phase line in the end region of the arrangement, the outline of the arrangement may coincide with line sections.

In particular, an arrangement is proposed for providing a vehicle with electric energy, wherein the arrangement comprises a receiving device adapted to receive the magnetic component of an alternating electromagnetic field and to produce an alternating electric current by magnetic induction, wherein the receiving device comprises at least one phase line, each phase line being adapted to carry a phase of the alternating electric current, wherein the at least one phase line is/are arranged to form a line arrangement which extends in a longitudinal direction transversely to a flux line direction, in which magnetic flux lines of the electromagnetic field penetrate the line arrangement, so that the line arrangement comprises a first end and a second end, the ends being located at opposite ends of the line arrangement in the longitudinal direction,
   a width of the line arrangement, which width can be measured in a width direction extending transversely to the flux line direction and transversely to the longitudinal direction, gradually decreases along the extension of the line arrangement towards the first end and/or towards the second end.

Furthermore, a method is proposed of manufacturing an arrangement for providing a vehicle with electric energy, wherein a receiving device of the arrangement is manufactured which is adapted—during operation—to receive the magnetic component of an alternating electromagnetic field and to produce an alternating electric current by magnetic induction, wherein the receiving device is equipped with at least one phase line, each phase line being adapted to carry—during operation—a phase of the alternating electric current, wherein the at least one phase line is/are arranged to form a line arrangement which extends in a longitudinal direction transversely to a flux line direction, in which magnetic flux lines of the electromagnetic field penetrate the line arrangement, so that the line arrangement comprises a first end and a second end, the ends being located at opposite ends of the line arrangement in the longitudinal direction,
   the line arrangement is formed in such a manner that a width of the line arrangement, which width can be measured in a width direction extending transversely to the flux line direction and transversely to the longitudinal direction, gradually decreases along the extension of the line arrangement towards the first end and/or towards the second end.

The "gradual decrease" is preferably restricted to a part of the extension of the line arrangement, namely to an end region of the line arrangement. However, the size of the end region is not limited to a specific maximum percentage of the total length of the line arrangement in the longitudinal direction. If the width of the line arrangement gradually decreases along the extension of the line arrangement towards the first end and towards the second end, there is a point in the middle section of the line arrangement where the width is maximal or there is a middle region in which the width is constant and larger than in the end sections.

If the receiving device is used or is to be used during travel of the vehicle, the longitudinal direction of the line arrangement is preferably parallel or identical to the direction of travel.

As mentioned above, another expression for the decrease of the width of the line arrangement towards the end is "tapered" or "tapered configuration".

The line arrangement of the receiving device may be a coil arrangement. Therefore, an arrangement is proposed for providing a vehicle with electric energy, wherein the arrangement comprises a receiving device adapted to receive the magnetic component of an alternating electromagnetic field and to produce an alternating electric current by magnetic induction, wherein the receiving device comprises at least one phase line, each phase line being adapted to carry a phase of the alternating electric current, wherein each phase line forms at least one coil,
   each coil consists of at least one turn of the phase line,
   the at least one turn is turning around a central axis of the coil,
   the coil or the coils is/are arranged to form a coil arrangement which extends in a longitudinal direction transversely to the central axis of the coil or transversely to the central axes of coils of the coil arrangement, so that the coil arrangement comprises a first end and a second end, the ends being located at opposite ends of the coil arrangement in the longitudinal direction, a width of the coil arrangement, which width can be measured in a width direction extending transversely to the central axis/axes and transversely to the longitudinal direction, gradually decreases along the extension of the coil arrangement towards the first end and/or towards the second end.

This corresponds to a method of manufacturing an arrangement for providing a vehicle with electric energy, wherein a receiving device of the arrangement is manufactured which is adapted—during operation—to receive the magnetic component of an alternating electromagnetic field and to produce an alternating electric current by magnetic induction, wherein the receiving device is equipped with at least one phase line, each phase line being adapted to carry—during operation—a phase of the alternating electric current, wherein at least one coil is formed by each phase line,
each coil is formed by at least one turn of the phase line, the at least one turn is turning around a central axis of the coil,
the coil or the coils is/are arranged to form a coil arrangement which extends in a longitudinal direction transversely to the central axis of the coil or transversely to the central axes of coils of the coil arrangement, so that the coil arrangement comprises a first end and a second end, the ends being located at opposite ends of the coil arrangement in the longitudinal direction,
the line arrangement is formed in such a manner that a width of the coil arrangement, which width can be measured in a width direction extending transversely to the central axis/axes and transversely to the longitudinal direction, gradually decreases along the extension of the coil arrangement towards the first end and/or towards the second end.

In particular, the coil arrangement may comprise a plurality of the coils which are arranged in the longitudinal direction in a consecutive sequence and/or overlapping each other and wherein at least one of the coils of the coil arrangement at the first and/or second end is tapered along the extension of the coil arrangement towards the respective end.

In particular, the receiving device may comprise a plurality of phase lines, each phase line being adapted to carry a different one of a plurality of phase currents of the alternating electric current. Each phase line may form one or a plurality of coils (e.g. at least three coils), each coil may consist of at least one turn of the phase line. The plurality of coils of the phase line or of each phase line may be located next to each other so as to form a sequence of coils which covers an effective area in a plane that extends perpendicularly to the central axes of the coils, so that there are a first and a second end coil at the opposite ends of the sequence. In case of at least three coils, there is at least one middle coil in between the end coils of the sequence. Preferably, at least both end coils are tapered. Optionally, middle coils can also be tapered along the extension of the coil arrangement in the longitudinal direction towards the ends.

In addition, an arrangement is proposed for providing a vehicle with electric energy, wherein the arrangement comprises a generating device adapted to generate an alternating electromagnetic field for producing an alternating electric current by magnetic induction in a corresponding receiving device, wherein the generating device comprises at least one phase line, each phase line being adapted to carry a phase of an alternating electric current, wherein the at least one phase line is/are arranged to form a line arrangement which extends in a longitudinal direction transversely to a flux line direction, in which magnetic flux lines of the electromagnetic field penetrate the line arrangement, so that the line arrangement comprises a first end and a second end, the ends being located at opposite ends of the line arrangement in the longitudinal direction,
a width of the line arrangement, which width can be measured in a width direction extending transversely to the flux line direction and transversely to the longitudinal direction, gradually decreases along the extension of the line arrangement towards the first end and/or towards the second end.

Accordingly, a method is proposed of manufacturing an arrangement for providing a vehicle with electric energy, wherein a generating device of the arrangement is manufactured which is adapted—during operation—to generate an alternating electromagnetic field for producing an alternating electric current by magnetic induction in a corresponding receiving device, wherein at least one phase line is provided for the generating device, wherein each phase line is adapted to carry—during operation—a phase of an alternating electric current, wherein the at least one phase line is/are arranged to form a line arrangement which extends in a longitudinal direction transversely to a flux line direction, in which—during operation—magnetic flux lines of the electromagnetic field penetrate the line arrangement, so that the line arrangement comprises a first end and a second end, the ends being located at opposite ends of the line arrangement in the longitudinal direction,
the line arrangement is formed in such a manner that a width of the line arrangement, which width can be measured in a width direction extending transversely to the flux line direction and transversely to the longitudinal direction, gradually decreases along the extension of the line arrangement towards the first end and/or towards the second end.

Preferably, at least one phase line of the line arrangement meanders in the longitudinal direction, wherein this phase line comprises first sections which extend transversely to the longitudinal direction and second sections connecting in each case two first sections, the second sections extending substantially in the longitudinal direction, and wherein the lengths of the first sections gradually decrease along the extension of the line arrangement towards the first end and/or towards the second end.

The tapered configuration of the line arrangement reduces the field intensity in particular sideways of the end region which is tapered. One reason for this is that the field intensity which is produced by phase line sections (e.g. the "first" line sections in case of a meandering line configuration) at the end or in the end region of the line arrangement, which line sections extend transversely to the longitudinal direction, is reduced since the lengths of these line sections are reduced due to the reduced width. This applies to locations in longitudinal direction in the ambience. For regions of the ambience sideways of the line arrangement, another reason applies: at the same location sideways of the end region of the arrangement, the distance to the nearest line section (e.g. a "second" line section in case of a meandering line configuration) is larger if the end region is tapered.

The invention also covers a vehicle comprising the arrangement with the receiving device of one of the embodiments described in this description, wherein the arrangement is located at the bottom of the vehicle, so that the central axis of the coil or the central axes of the coils extend in vertical direction, provided that the vehicle travels on a horizontal underground or horizontal track.

Furthermore, the invention covers a system for transferring energy to a vehicle, wherein the system comprises an arrangement with the primary side generating device, which is arranged along a path of travel of the vehicle or at a parking area or stopping area of the vehicle, and wherein the system comprises the arrangement with the secondary side receiving device of one of the embodiments described in this description.

Examples of the invention will be described in the following with reference to the attached figures.

DESCRIPTION OF THE INVENTION

Figure 1:
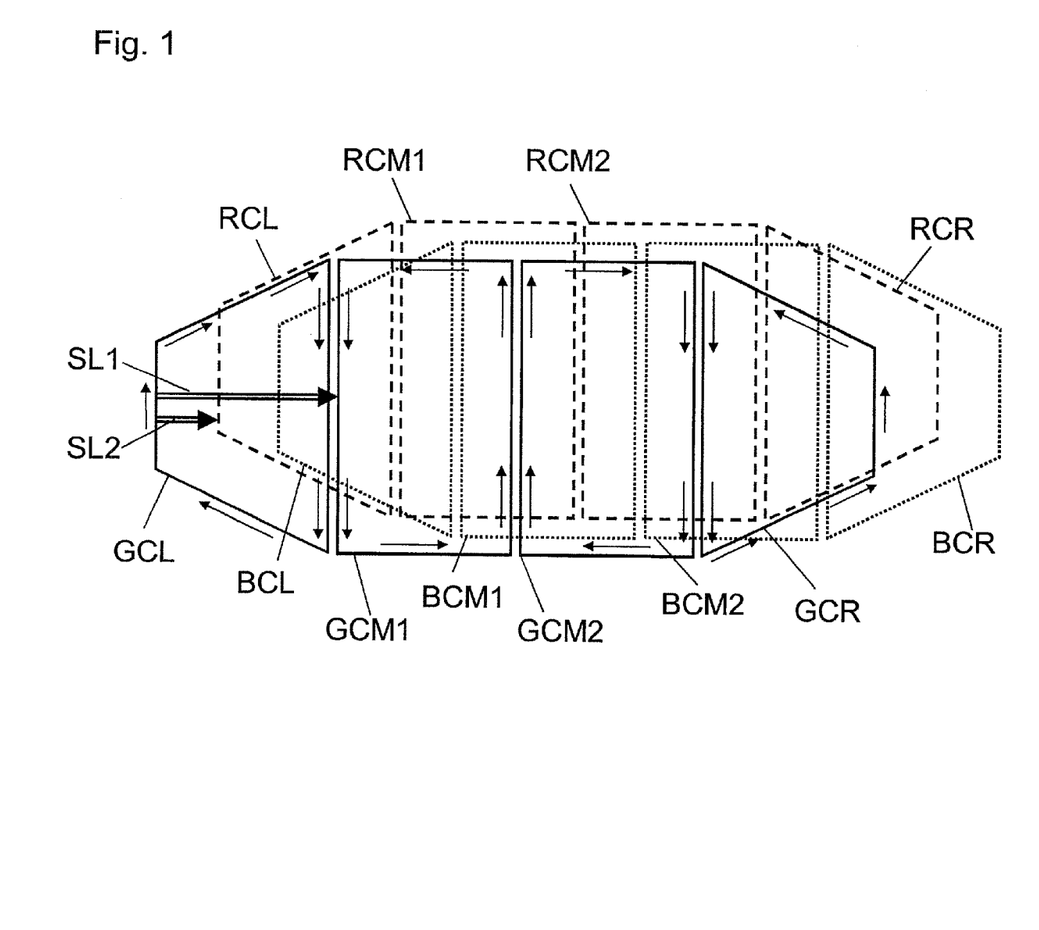
FIG. 1 schematically shows a top view of an arrangement for providing a vehicle with electric energy, wherein the arrangement comprises three phase lines, wherein each phase line forms a sequence of four coils which are placed next to each other, FIG. 2 schematically shows a top view similar to FIG. 1 comprising a sequence of three coils of a phase lines.

FIG. 1 shows three sequences of coils, wherein each sequence is formed by a different phase line of a coil arrangement (i.e. an arrangement of electric conductors) for carrying a three-phase alternating current. The arrangement may be part of a generating device for generating an electromagnetic field on a primary side (e.g. track side) or may be part of a receiving device mounted to a vehicle.

Each of the sequences G, R, B comprises four coils C. The individual coils are denoted by GCL, GCM1, GCM2, GCR for sequence G, by RCL, RCM1, RCM2, RCR for sequence R and by BCL, BCM1, BCM2, BCR for sequence B. In the example, the middle coils C have a rectangular shape, i.e. the area which is covered by the respective shape is rectangular. However, the end coils GCL, RCL, BCL and GCR, RCR, BCR are tapered towards the end of the sequence.

This example illustrates an embodiment of the present invention, wherein the coil arrangement comprises coils of more than one phase line (i.e. a plurality of phase lines), wherein the coils of the different phase lines are shifted relative to each other in the longitudinal direction (the horizontal direction in the example of FIG. 1) and wherein each phase line is tapered in the respective end region of the phase line. The term "end region" refers to the longitudinal direction, i.e. there are two opposite end regions in the longitudinal direction.

Coming back to the example of FIG. 1, since each sequence G, R, B of coils C is formed by placing the individual coils C next to each other, the effective area of each sequence G, R, B is rectangular in the middle sections and is shaped like a frustum cone in the end regions. Furthermore, the coils C of the same phase line do not overlap, so that the effective area of the sequence is equal to the sum of the areas which are covered by the coils C of the sequence G, R, B. In order to illustrate the notation more clearly, for example the notation of the coil "GCL" means that the coil is part of the sequence G and that the coil is the left L coil (i.e. the first end coil) in the sequence G. The notation "GCM1" means that the coil C is part of the sequence G and is the first middle M1 coil C. The notation "R" as the third letter in the notation of a coil (e.g. GCR) means that the coil is the right R coil (i.e. the second end coil) in the respective sequence. The three sequences G, R, B shown in FIG. 1 are spread in the vertical direction of the figure, but this is done only for the purpose of illustration. In practice, it is preferred that there is no spread in the direction perpendicular to the longitudinal direction which extends from the left coil to the right coil in each sequence and which is the horizontal direction in FIG. 1.

Figure 2:
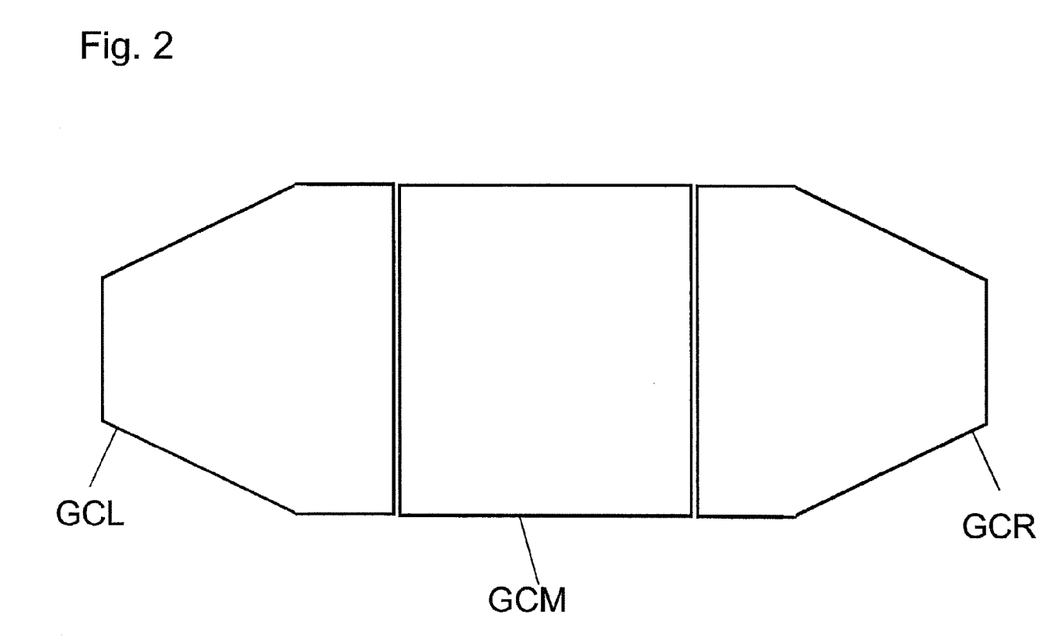
Figure 3:
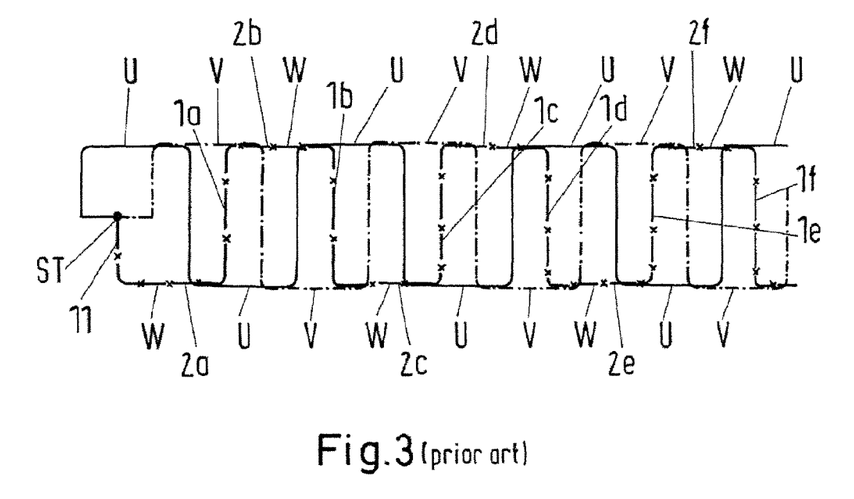
FIG. 3 shows a partial top view of a conventional line arrangement comprising three meandering phase lines.
Figure 4:
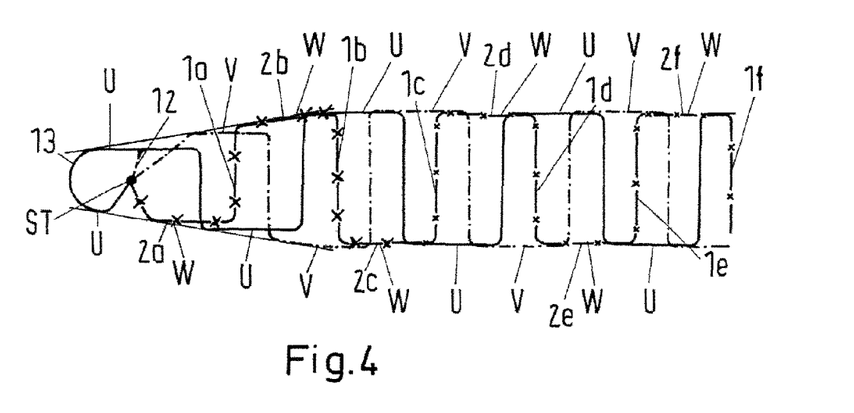
FIG. 4 shows a partial top view of a line arrangement comprising three meandering phase lines according to an example of the present invention.

The coils of the sequence G are shifted relative to each other by a first shift length SL1 and this first shift length SL1 is constant for all pairs of the coils of sequence G and the same applies to the other sequences R and B. The same may also apply to other arrangements which may comprise a different number of coils per sequence, e.g. the number of middle coils having a rectangular shape may vary with different embodiments of the arrangement. The first shift length SL1 is illustrated by a double line arrow. There are also single line arrows extending next to the coils C of the sequence G. These single line arrows illustrate the direction of winding the phase line in order to produce the turns which constitute the coils C. The other sequences R, B are formed in the same manner as the sequence G. However, the different sequences G, R, B are shifted relative to each other by a second shift length SL2, which is also illustrated by a double line arrow for the sequences G, R. The third sequence B is also shifted by the same second shift length SL2 relative to the second sequence R. This second shift length SL2 is ⅓ of the first shift length SL1. Provided that the arrangement shown in FIG. 1 is a receiving device, an electromagnetic field, which has varying periodic field intensity with respect to the longitudinal direction (such varying magnetic fields are shown in FIG. 2-FIG. 4), wherein the period length is equal to the first shift length SL1 multiplied by two, induces electric voltages of the same size in each line section which extends transversely to the longitudinal direction, provided that these line sections are placed at the same position in the longitudinal direction or at the same position plus or minus two times the first shift length SL1. Another precondition for the induction of voltages of the same size is same line length, which does not apply to the line sections at the ends and the next transversely extending line sections.

In particular, flux lines of an alternating magnetic field penetrate the line arrangement in the direction perpendicular to the image plane of FIG. 1 and FIG. 2.

For one of the sequences of coils, namely for sequence G, FIG. 1 shows an example of a pattern of directions (indicated by arrows) in which electric currents flow through the coils. This example is based on the assumption that an electromagnetic field induces voltages in the coils of sequence G, wherein the field strength of the electromagnetic field varies periodically in the longitudinal direction and the periodic lengths is equal to two times the second shift lengths SL2.

Variants of the arrangement shown in FIG. 1 are possible. The arrangement may not be a coil arrangement, the lines of which are represented by the solid, dashed or dotted lines in FIG. 1. Rather, these solid, dashed and dotted lines, with the exception of the lines in the middle that extend transversely to the longitudinal direction, may represent the outline of the line arrangement. The electric lines of the line arrangement may follow any suitable path within the outline. Especially in this case, the complete line arrangement may be arranged within the outline defined by the solid lines (i.e. the dashed and dotted lines in FIG. 1 may be omitted).

The number of sequences and, therefore, the number of phase lines for carrying different phases of an alternating current may vary. For example, the coil arrangement of FIG. 1 may have two or four phase lines for carrying different phases. Only one of the end sections of the line arrangement or of a sequence of coils may be tapered. In addition or alternatively, a tapered end section may be tapered in a different manner as shown in FIG. 1, for example the outline in the tapered section may be curved instead of straight as shown in FIG. 1.

It is not required that the tapered end section extends in the longitudinal direction over the same length as the end coil, if the line arrangement is a coil arrangement at all. Rather, the length of the tapered end section may be shorter or longer than the length of the coil at the respective end. For example, referring to FIG. 1, the first middle coil GCM1 may also belong to the tapered end section. In particular, half of the lengthwise extension of the first middle section GCM1 may be tapered so that the length of the tapered end section is 1.5 times the length of a coil.

FIG. 2 shows an example of a sequence of three coils, a first end coil GCL, a middle coil GCM and a second end coil GCR, wherein the three coils are formed by the same phase line. In the example, the tapered end sections at the opposite ends of the sequence extend over two thirds of the respective end coil GCL, GCR. However, the tapered end section may extend over a different fraction of the total extension of the coil or may extend over the whole extension of the coil in the longitudinal direction.

Due to their tapered configuration along their extensions towards the end of the coil arrangement shown in FIG. 2, the end coils GCL, GCR cover in each case a smaller area per unit length in the longitudinal direction in their end region next to the end of the coil arrangement compared to their border region at the border zone to the middle coil GCM.

Connecting lines for connecting the different coils to each other and to external devices (such as a rectifier) are not shown in the schematic drawings of FIG. 1 and FIG. 2.

FIG. 3 schematically shows a top view of a conventional line arrangement of a generating device for generating an electromagnetic field on a primary side of a system for transferring energy to a vehicle. The line arrangement comprises three phase lines U, V, W which meander in the longitudinal direction (horizontal direction in FIG. 3). Only part of the line arrangement is shown. In particular, the line arrangement may continue in the same manner as shown on the right hand side of the figure. Close to the end of the line arrangement shown on the left hand side of FIG. 3, the three phase lines U, V, W are connected to each other so that a star point ST is formed.

Each of the phase lines U, V, W comprises first sections which extend transversely to the longitudinal direction and comprises second line sections which connect in each case two first lines sections and at least partially extend in the longitudinal direction. In FIG. 3, the first line sections of phase line W (indicated by solid line segments and crosses) are denoted by 1a, 1b, 1c, 1d, 1e, 1f. The connecting second line sections of phase line W are denoted by 2a, 2b, 2c, 2d, 2e, 2f, wherein second line section 2a connects first line section 1a with a short line section 11 that connects the phase line W to the star point ST.

The first line sections of the different phases U, V, W produce an electromagnetic field during operation, the field intensity of which rapidly decreases sideways of the line arrangement with increasing distance to the line arrangement. In the example shown in FIG. 3, "sideways" means in a direction perpendicular to the longitudinal direction within the image plane of FIG. 3. The same applies to the electromagnetic field which is produced by the second line sections, since the phase lines U, V, W are operated at a phase shift and interference with cancellation occurs. However, there is an exception: at the end of the line arrangement shown on the left hand side of FIG. 3, in the region of the star point ST, interference may compensate the electromagnetic fields which are produced by the individual phase lines U, V, W, partially, but a significant field intensity can be measured sideways of the end region and in the longitudinal direction towards the left.

In order to reduce the field intensity near the end region, a modified line arrangement is shown in FIG. 4. The end section of the line arrangement on the left hand side shown in FIG. 4 is modified compared to the arrangement shown in FIG. 3. The modification only refers to the section on the left hand side of first line section 1b of phase line W. In this end section, the lengths of the first line sections of all three phase lines U, V, W are gradually reduced towards the end. Consequently, the connecting second line sections, such as the second line section 2a of phase line W, are also modified. For example, the second line sections can i) either extend parallel to the outline of the line arrangement in its tapered end section (see for example section 2b) or ii) the length of the first line sections (see for example section 1a) can be reduced further so that the second line sections (see for example section 2a) extend parallel to the longitudinal axis (horizontal direction in FIG. 4). Both principles i) and ii) can be combined in the same embodiment of a line arrangement or only one of the principles i) or ii) can be realized in an embodiment.

In the region of the star point ST, different configurations of the phase lines U, V, W are possible as indicated by the dashed section 12 and the solid line section 13 of phase line U. In practice, either line section 12 or line section 13 is present.

The modified configuration of the line arrangement in FIG. 4 significantly reduces the field intensity near the end section. In particular, the field intensity is significantly reduced towards the left of FIG. 4, in longitudinal direction. But also the field intensity sideways of the end section is reduced, if the field intensity is measured at the same distance from the center line of the line arrangement which extends in the longitudinal direction. The reason is that the distance to the nearest phase line is larger compared to the arrangement of FIG. 3.

The end section of the line arrangement, which is shown on the left hand side of FIG. 4, is tapered like a frustum cone, as indicated by two outlines.

Figure 5:
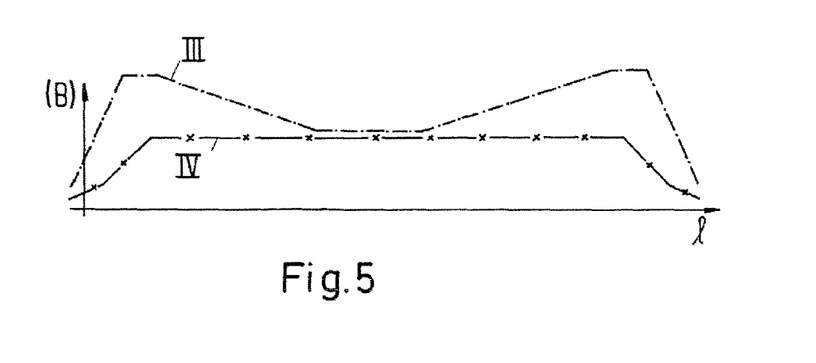
FIG. 5 shows the field intensities sideways of the line arrangements of FIG. 3 and FIG. 4 as functions of the position in longitudinal direction.

The field intensity which is produced by the same three-phase alternating current through the line arrangement of FIG. 3 and through the line arrangement of FIG. 4 is schematically shown in FIG. 5. The field intensity |B| is shown as a function of the position I for the two arrangements, provided that the opposite end sections are both tapered. Reference numeral III denotes the dependency of the field intensity for the line arrangement of FIG. 3 and reference numeral IV denotes the dependency of the field intensity of the line arrangement shown in FIG. 4. It is apparent that the tapered configuration of the end sections reduces the maximum field intensity and, in addition, the field intensity decreases faster towards zero in longitudinal direction near the end sections with increasing distance to the end of the line arrangement in longitudinal direction. The field intensities shown in FIG. 5 are measured at a constant distance in lateral direction to the center line of the line arrangement.

Figure 6:
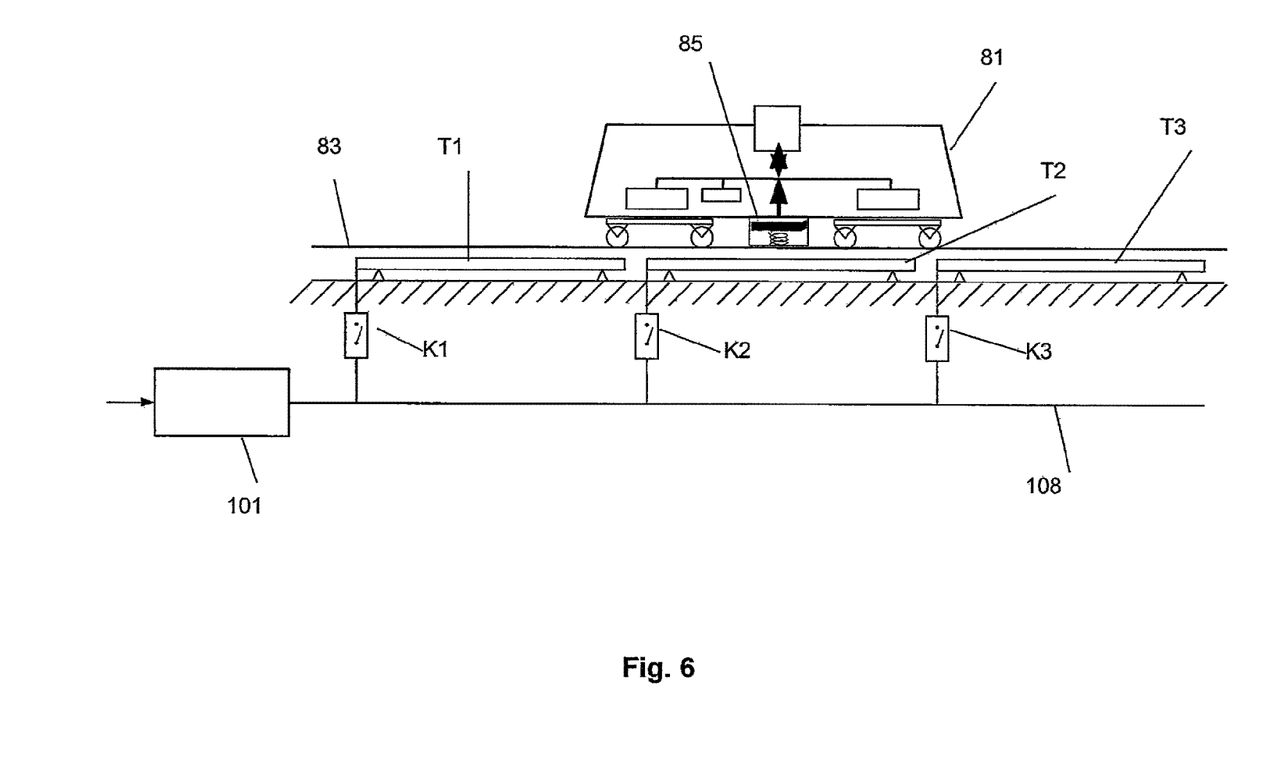
FIG. 6 shows schematically a primary side conductor arrangement for producing an electromagnetic field, in particular for producing a magnetic wave which propagates in the direction of travel of a vehicle, wherein the vehicle is also schematically shown in the figure, and FIG. 7 schematically shows the vehicle of FIG. 6, including some devices within the vehicle.

FIG. 6 shows a track 83 (here: a railway track having two rails) which is occupied by a track bound vehicle 81, such as a regional public transport train or a tram. A primary side electric conductor arrangement is mounted to the track for producing an electromagnetic field. It comprises segments T1, T2, T3 which can be operated independently of each other. In the situation shown in FIG. 6, the middle segment T2 is operated only, since the receiving device 85 of the vehicle 81 is located above the segment T2. For example, the primary side conductor arrangement may be designed as described in WO 2010/031595 A2 in connection with FIG. 1 in the document or may be designed in the manner shown in FIG. 3 or 4 of the present description. As shown in the attached FIG. 6, each of the successive segments T1, T2, T3 may be connected via a separate switch K1, K2, K3 for switching on and off the segment T1, T2, T3 to a main line 108. In the case of a three-phase alternating current system, the mainline 108 may comprise wires or cables for each phase. The far end of the mainline 108 (at the right hand side of FIG. 6, but not shown) may comprise a common star point of all three-phases. Alternatively, the main line 108 may be a DC (direct current) line and the switches K1, K2, K3 may comprise inverters for producing the alternating current through the segments T1, T2, T3. The opposite site of the main line 108 is connected to an energy source 101.

The primary side conductor arrangement (i.e. the line arrangement of the generating device) may be located underground or above ground. In particular in the case of railways having two rails on which wheels of rail vehicles may roll, the conductor arrangement may be located above ground between the rails on the level of a railway sleeper, or partly above ground, but under the railway sleepers. If the railway sleepers are made of concrete for example, the sleepers or the other construction for holding the rails may comprise holes and/or cavities, through which the line or lines of the conductor arrangement extends. Thereby, the railway construction may be used to hold the line(s) in the desired serpentine shape. In case of a road, the primary side conductor arrangement may also be located underground (i.e. integrated in the material of the road) and/or above ground.

The track bound vehicle 81 comprises at its underside the receiving device 85 for receiving the electromagnetic field which is produced by the primary side conductor arrangement. The receiving device 85 is electrically connected to an on-board electric network 86 (see FIG. 7) so that the electric energy, which is induced in the receiving device 85 may be distributed within the vehicle 81. For example, auxiliary devices 90 and propulsion units 80, 84 for driving propulsion motors (not shown) in bogies 87a, 87b having wheels 88a, 88b, 88c, 88d may be connected to the distribution network 86. Furthermore, an energy storage 82, such as an electrochemical energy storage and/or an arrangement of capacitors, such as super caps, may also be connected to the distribution network. Therefore, the energy storage 82 may be charged by the energy received by the receiving device 85, in particular during stops of the vehicle 81 on the track.

Figure 7:
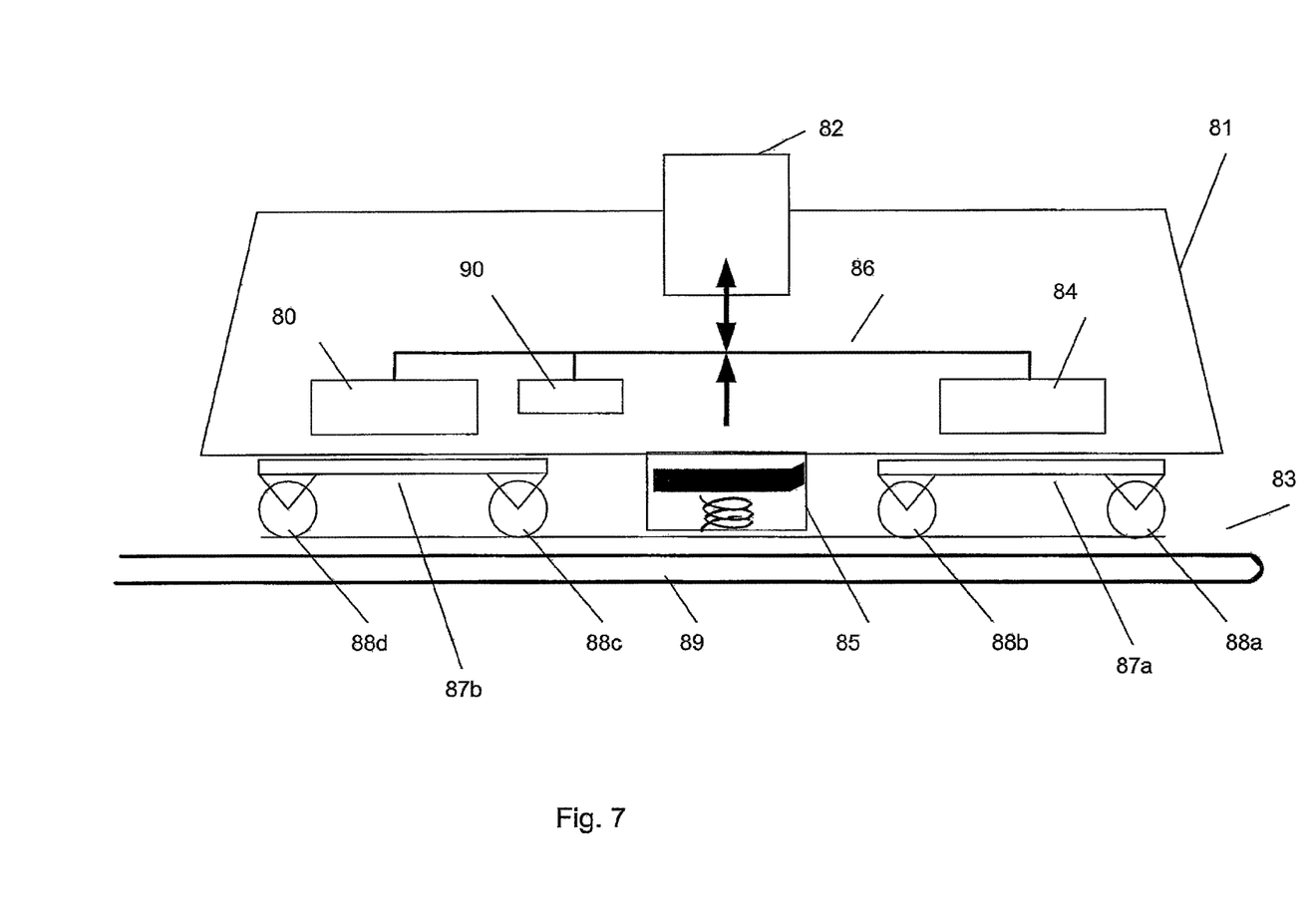

When the vehicle 81 is moving on the track, a part of the propulsion energy which is needed to move the vehicle 81 may be withdrawn from the energy storage 82 and at the same time the energy, which is received by the receiving device may contribute to the propulsion, i.e. may be part of the propulsion energy.

The system for transferring energy to a vehicle as shown in FIG. 6 and FIG. 7 is just an example. For example, the invention can be used alternatively for charging a bus of a public transport system while the bus stops for allowing passenger to enter and leave the bus or can be used to charge batteries of an automobile while the automobile is parked.

The invention claimed is:

1. An apparatus for providing a vehicle with electric energy, the apparatus comprising: a receiving device configured for receiving a magnetic component of an alternating electromagnetic field and for producing an alternating electric current by magnetic induction, wherein the receiving device comprises at least one phase line, each phase line being configured for carrying a phase of the alternating electric current, wherein the at least one phase line forms a line arrangement which extends in a longitudinal direction transversely to a flux line direction, in which magnetic flux lines of the electromagnetic field penetrate the line arrangement, wherein the line arrangement comprises a first end and a second end, the first end and the second end being located at opposite ends of the line arrangement in the longitudinal direction, wherein the width of the line arrangement can be measured in a width direction extending transversely to the flux line direction and transversely to the longitudinal direction, and wherein the width of the line arrangement is tapered along the extension of the line arrangement towards the first end or towards the second end.

2. An apparatus for providing a vehicle with electric energy, the apparatus comprising: a receiving device configured for receiving a magnetic component of an alternating electromagnetic field and for producing an alternating electric current by magnetic induction, wherein the receiving device comprises at least one phase line each phase line being adapted to carry a phase of the alternating electric current,
wherein
each phase line forms at least one coil,
each coil comprises at least one turn of the phase line,
the at least one turn turns around a central axis of the coil,
the at least one coil forms a coil arrangement which extends in a longitudinal direction transversely to the central axis of the coil arrangement, wherein the coil arrangement comprises a first end and a second end, the first end and the second end being located at opposite ends of the coil arrangement in the longitudinal direction,
a width of the coil arrangement, which width can be measured in a width direction extending transversely to the central axis and transversely to the longitudinal direction, gradually decreases along the extension of the coil arrangement towards the first end or towards the second end, and wherein the coil arrangement is tapered along the extension of the coil arrangement towards the first end and/or the second end.

3. The apparatus of claim 2, wherein at least two of the coils of the coil arrangement are coils of a same phase line which are consecutively arranged in the longitudinal direction thereby defining at least one border zone, where a first coil and a second coil of the at least two coils of the same phase line border on each other, wherein the first coil is an end coil located at the first end or at the second end of the coil arrangement and wherein due to its tapered configuration along its extension towards the first end or towards the second end.

4. The apparatus of claim 2, wherein the arrangement is located at a bottom of a vehicle, wherein a central axes of the coils extend in vertical direction, provided that the vehicle travels on a horizontal underground or horizontal track.

5. An apparatus for providing a vehicle with electric energy, comprising a generating device configured for generating an alternating electromagnetic field for producing an alternating electric current by magnetic induction in a corresponding receiving device, wherein the generating device comprises at least one phase line, each phase line being configured for carrying a phase of an alternating electric current, wherein the at least one phase line forms a line arrangement which extends in a longitudinal direction transversely to a flux line direction, in which magnetic flux lines of the electromagnetic field penetrate the line arrangement, so that the line arrangement comprises a first end and a second end, the first end and the second end being located at opposite ends of the line arrangement in the longitudinal direction, a width of the line arrangement, which width can be measured in a width direction extending transversely to the flux line direction and transversely to the longitudinal direction, is tapered along the extension of the line arrangement towards the first end or towards the second end.

6. The apparatus of claim 5, wherein at least one phase line of the line arrangement meanders in the longitudinal direction, wherein each phase line comprises first sections which extend transversely to the longitudinal direction and second sections connecting in each case two first sections, the second sections extending substantially in the longitudinal direction, and wherein the lengths of the first sections gradually decrease along the extension of the line arrangement towards the first end or towards the second end.

7. The apparatus of claim 5, wherein the line arrangement is a coil arrangement comprising a plurality of coils which are arranged in the longitudinal direction and wherein at least one of the coils at the first end and the second end of the coil arrangement is tapered along the extension of the coil arrangement towards the first end and the second end, respectively.

8. The apparatus of claim 5, wherein at least two of the coils of the coil arrangement are coils of a same phase line which are consecutively arranged in the longitudinal direction thereby defining at least one border zone, where a first coil and a second coil of the at least two coils of the same phase line border on each other, wherein the first coil is an end coil located at the first end or at the second end of the coil arrangement and wherein due to its tapered configuration along its extension towards the first end or towards the second end.

9. A method of manufacturing an apparatus for providing a vehicle with electric energy, the method comprising: adopting a receiving device of the apparatus during operation to receive the magnetic component of an alternating electromagnetic field and to produce an alternating electric current by magnetic induction, wherein the receiving device is equipped with at least one phase line, each phase line being adapted to carry during operation a phase of the alternating electric current, forming a line arrangement via the at least one phase line, wherein the line arrangement extends in a longitudinal direction transversely to a flux line direction, in which magnetic flux lines of the electromagnetic field penetrate the line arrangement, wherein the line arrangement comprises a first end and a second end, the first end and the second end being located at opposite ends of the line arrangement in the longitudinal direction, wherein a width of the line arrangement, which width can be measured in a width direction extending transversely to the flux line direction and transversely to the longitudinal direction, is tapered along the extension of the line arrangement towards the first end or towards the second end.

10. A method of manufacturing an apparatus for providing a vehicle with electric energy, the method comprising, adapting a receiving device of the apparatus during operation to receive a magnetic component of an alternating electromagnetic field and to produce an alternating electric current by magnetic induction, equipping the receiving device with at least one phase line, each phase line being adapted to carry—during operation—a phase of the alternating electric current, wherein
at least one coil is formed by each phase line,
each coil comprises at least one turn of the phase line,
the at least one turn turns around a central axis of the coil,
the at least one coil forms a coil arrangement which extends in a longitudinal direction transversely to the central axis of the coil of the coil arrangement, wherein the coil arrangement comprises a first end and a second end, the first end and the second end being located at opposite ends of the coil arrangement in the longitudinal direction,
a width of the coil arrangement, which width can be measured in a width direction extending transversely to the central axis and transversely to the longitudinal direction, gradually decreases along the extension of the coil arrangement towards the first end or towards the second end, and
wherein the coil arrangement is tapered along the extension of the coil arrangement towards the first end and/or the second end.

11. The method of claim 10, further comprising arranging the apparatus at a bottom of a vehicle, wherein a central axes of the coils extend in vertical direction, provided that the vehicle travels on a horizontal underground or horizontal track.

12. A method of manufacturing an apparatus for providing a vehicle with electric energy, the method comprising adapting a generating device of the apparatus—during operation—to generate an alternating electromagnetic field for producing an alternating electric current by magnetic induction in a corresponding receiving device, wherein at least one phase line is provided for the generating device, wherein each phase line is adapted to carry—during operation—a phase of an alternating electric current, forming a line arrangement via the at least one phase line, wherein the line arrangement extends in a longitudinal direction transversely to a flux line direction, in which—during operation—magnetic flux lines of the electromagnetic field penetrate the line arrangement, wherein the line arrangement comprises a first end and a second end, the first end and the second end being located at opposite ends of the line arrangement in the longitudinal direction,
a width of the line arrangement, which width can be measured in a width direction extending transversely to the flux line direction and transversely to the longitudinal direction, is tapered along the extension of the line arrangement towards the first end or towards the second end.

13. The method of claim 12, wherein at least one phase line of the line arrangement is arranged to meander in the longitudinal direction, so that this phase line comprises first sections which extend transversely to the longitudinal direction and second sections connecting in each case two first sections, the second sections extending substantially in the longitudinal direction, and wherein the lengths of the first sections gradually decrease along the extension of the line arrangement towards the first end or towards the second end.

* * * * *

UNITED STATES PATENT AND TRADEMARK OFFICE
CERTIFICATE OF CORRECTION

PATENT NO. : 9,935,497 B2  
APPLICATION NO. : 14/396200  
DATED : April 3, 2018  
INVENTOR(S) : Robert Czainski et al.

Page 1 of 1

It is certified that error appears in the above-identified patent and that said Letters Patent is hereby corrected as shown below:

In the Claims

Column 15, Line 1, Claim 3, delete "wherein due" and insert -- wherein – due --

Column 15, Line 3, Claim 3, after end, delete "." and insert -- -the first coil covers a smaller area per unit length in the longitudinal direction in an end region at the first end or second end compared to a border region at the at least one border zone. --

Column 15, Line 50, Claim 8, delete "wherein due" and insert -- wherein – due --

Column 15, Line 52, Claim 8, delete "." and insert -- -the first coil covers a smaller area per unit length in the longitudinal direction in an end region at the first end or second end compared to a border region at the border zone. --

Column 15, Line 60, Claim 9, delete "carry during operation a phase" and insert -- carry – during operation – a phase --

Signed and Sealed this  
Third Day of July, 2018

Andrei Iancu  
*Director of the United States Patent and Trademark Office*